E. M. REESE.
ADJUSTING MECHANISM FOR ROAD GRADERS.
APPLICATION FILED MAR. 23, 1914.
1,151,822.
Patented Aug. 31, 1915.
2 SHEETS—SHEET 2.
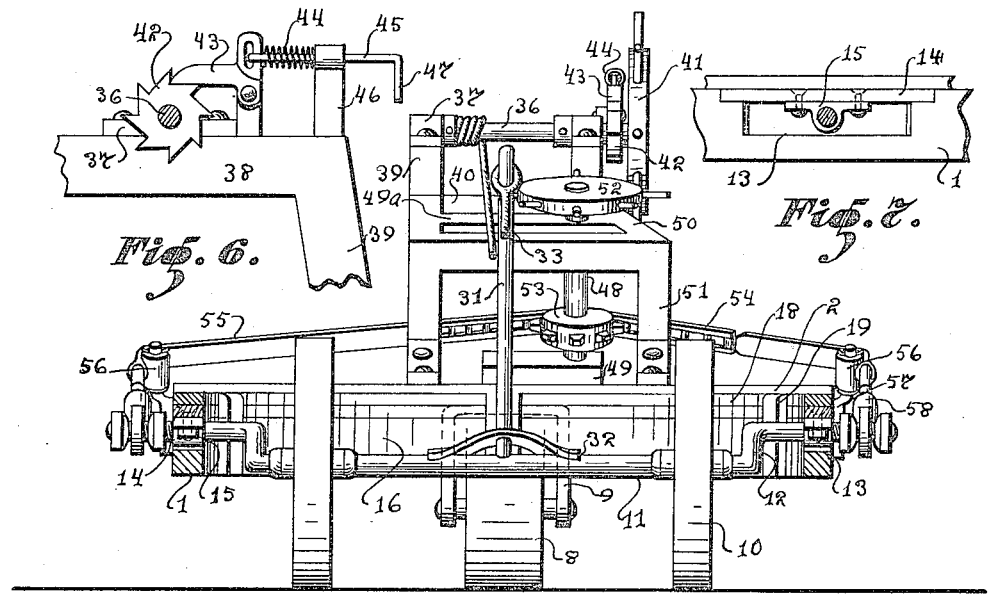
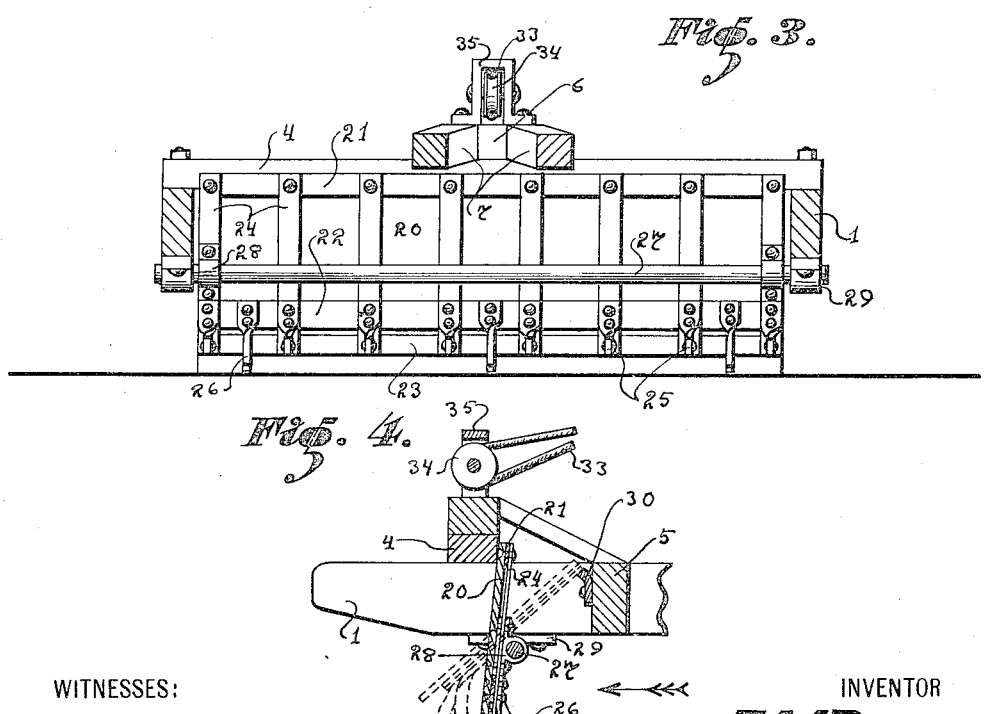
WITNESSES:
Ce H. Ellis
R. C. Bruckner.
INVENTOR
E. M. Reese
BY
John W. Spellman
ATTORNEY

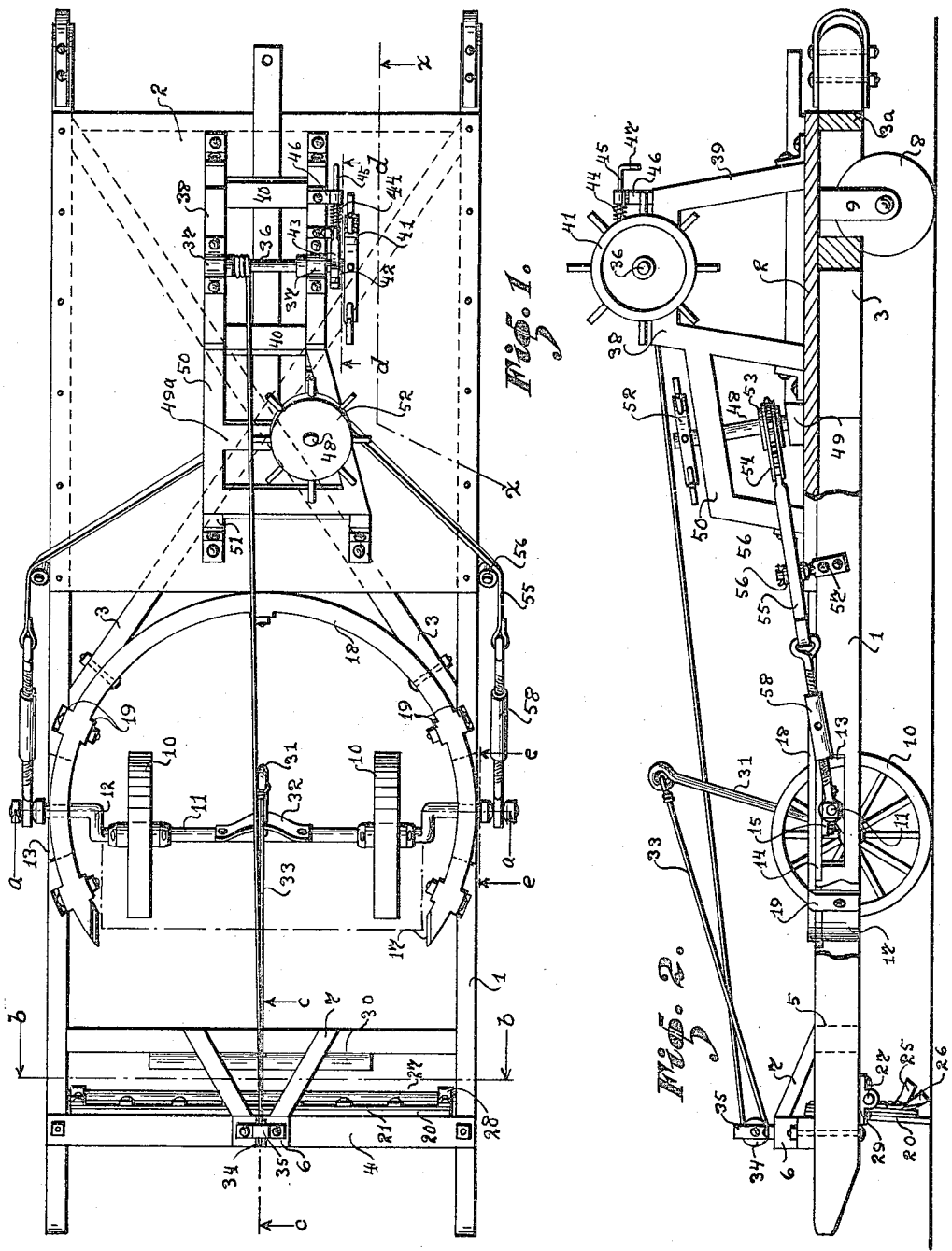

UNITED STATES PATENT OFFICE.

EDWIN M. REESE, OF TEXARKANA, ARKANSAS.

ADJUSTING MECHANISM FOR ROAD-GRADERS.

1,151,822.

Specification of Letters Patent. Patented Aug. 31, 1915.

Application filed March 23, 1914. Serial No. 826,493.

*To all whom it may concern:*

Be it known that I, EDWIN M. REESE, citizen of the United States, residing at Texarkana, in the county of Miller and State of Arkansas, have invented certain new and useful Improvements in Adjusting Mechanism for Road-Graders, of which the following is a specification.

My invention relates to a new and useful adjusting mechanism for a road grader. Its object, broadly stated, is to provide a simple and easily operated mechanism for adjusting the scraping and plowing tool of a road grader between two limiting positions, in one of which the tool is contiguous with the ground and ready for work, while in the other position it is sufficiently elevated above the ground to offer no impediment to the travel of the machine.

The object of the invention more specifically stated is to secure vertical adjustment of the scraping and plowing tool of a road grader by manually producing rotation of an axle formed with cranks upon its extremities, which have engagement with that extremity of the frame at which the scraping and plowing tool is mounted, said extremity of the frame thus being raised or lowered by rotation of the correlated axle.

A still further object of the invention is to provide a device of the character described that will be strong, durable, efficient and simple and comparatively inexpensive to produce, also one in which the several parts will not be likely to get out of working order.

With the above and other objects in view, the invention has relation to certain novel features of construction and operation, an example of which is described in the following specification and illustrated in the accompanying drawings, wherein;

Figure 1 is a plan view of a road grader, having the combined functions of a scraper and plow, with which my novel adjusting mechanism is shown correlated. Fig. 2 is a view of the same partially in side elevation and partially in section, the section being taken upon the line *x—x* of Fig. 1. Fig. 3 is a vertical sectional view, the section being taken upon the line *a—a* of Fig. 1. Fig. 4 is a vertical sectional view upon the line *b—b* of Fig. 1. Fig. 5 is a detail sectional view of the combined plowing and scraping tool, the section being taken upon the line *c—c* of Fig. 1. Fig. 6 is a detail sectional view of a certain pawl and ratchet mechanism embodied in my invention, the section being taken upon the line *d—d* of Fig. 1. Fig. 7 is a detail sectional view taken upon the line *e—e* of Fig. 1.

Referring now more particularly to the drawings, wherein like reference characters designate similar parts in all the figures, the numeral 1 denotes a pair of elongated parallel beams which are embodied in the frame of a road grader at each side thereof. Between the beams 1 a large platform 2 is extended at one end of the frame, said beams being further connected beneath the platform by crossed diagonal braces 3, and by the cross beam 3ª extending beneath the edge of the platform nearest adjacent to the correlated end of the frame. At the other end of the frame, the beams 1 are rigidly connected by a pair of cross bars 4 and 5, the former having its extremities surmounted upon the beams 1, and the latter being extended between said beams slightly spaced from the former toward the platform. Hereinafter that extremity of the frame upon which the platform 2 is provided will be referred to as the rear end, the other extremity as the front end of the road grader. It is to be understood, however, that this designation does not indicate the direction of travel, since the road grader with which my invention is correlated will travel sometimes in one direction and sometimes in the other. Upon the cross piece 4 at its center, there is mounted a block 6 from which a pair of divergent downwardly inclined brace members 7 extend to the cross piece 5.

At rear end of the road grader, there is provided a single transporting wheel 8, which is mounted in a standard 9 of inverted U-shape secured to the platform 2 there beneath. The front portion of the road grader is provided with two transporting wheels 10, which are rotatably mounted upon an axle 11, between the beams 1, and are respectively equidistant from said beams. Just outside of each wheel 10, the axle 11 is offset as indicated at 12, the end portions of the axle thus having the form of cranks. Said end portions are extended respectively through apertures 13 oppositely formed in the upper portions of the beams 1. The apertures 13 are slightly elongated longitudinally of the correlated beams, so as to permit the axle to undergo a certain swivel motion about its center, as will presently be described. The apertures 13 are respectively covered by the end portions of an arcuate bar 14, concentric with the axle, and extending through an arc somewhat greater than one-hundred and eighty degrees. Within each aperture 13, a bearing 15 is mounted fast upon the bar 14 there beneath to receive the correlated extremity of the axle. That portion of the bar 14 which lies to the rear of the apertures 13 is supported upon an arcuate beam 16, having each of its extremities terminating adjacent to the correlated apertures 13, and rigidly secured to the adjacent beams 3 and 1. The extremities of the bar 14 respectively rest upon arcuate blocks 17 rigidly secured to the beams 1 just in front of the apertures 13. Just above the bar 14, there is mounted a parallel arcuate bar 18, which is rigidly secured to the members 16 and 17 by several pairs of lugs 19, straddling said parts 16 and 17 and bolted thereto. The lugs 19 hold the bar 14 in its proper place between the bar 18 and the members 16 and 17, without restricting said bar 14 from a swivel motion to which it may be subjected jointly with the axle. A mechanism for actuating such a motion will presently be described.

A description will now be given of the combined plowing and scraping tool which is mounted at the front end of the road grader. Said tool is comprised of a rectangular plate 20 transversely disposed between the forward ends of the beams 1, which plate is reinforced by three horizontal bars designated by the numerals 21, 22 and 23 respectively, and a plurality of equidistant bars 24 mounted upon the horizontal bars parallel to the lateral edges of the plate 20. The plate 20 will preferably have a length such that its extremities will be only slightly spaced from the beams 1. Upon the lower ends of the members 24, there are respectively mounted fast plows 25, diverging rearwardly from the plate 20 at a downward inclination. Upon the bar 22, there are mounted three brackets 26, extending downwardly and rearwardly from the plate 20, forming a considerably smaller angle with said plate than that formed by the plows. The scraping tool is mounted fast upon a rock-shaft 27 by a pair of clamping brackets 28, respectively secured to members 24 adjacent to the ends of the tool. The extremities of the rock-shaft 27 are respectively journaled in bearings 29 oppositely mounted upon the beams 1 there beneath. The scraping and plowing tool is adapted to undergo a limited angular displacement about the axis established by the rock-shaft 27, the limiting positions of this displacement being established in one instance by contact of the upper edge of the plate 20 with the cross bar 6, and in the other instance by a stop bar 30, secured to the member 5 and elongated parallel to said member.

When the road grader is traveling in the direction of the arrow shown in Fig. 5, the plowing and scraping tool will occupy the position shown in full lines in the same figure, its function at such times being that of a scraper. When the grader is traveling in the other direction the position of the tool will be that illustrated in dash lines in Fig. 5 and its function will be that of a plow.

In order to adjust the combined plowing and scraping tool vertically so as to bring it either into its working position or out of contact with the ground, I raise or lower the entire front end of the frame by means of a mechanism which will now be described. From the center of the axle 11 a lever 31 is extended rigidly upward, the connection between said lever and the axle being strengthened by a brace plate 32. From the upper extremity of the lever 31, a cable 33 is extended to the forward end of the road grader, and is there carried by a sheave 34 mounted in an arched bracket 35, surmounted upon the block 6. From the sheave 34 the cable 33 is carried rearwardly, and is secured to a shaft 36 upon which it is adapted to be coiled, said shaft being disposed at an elevation above the platform 2 in a transverse relation to the road grader. The extremities of the shaft 36 are journaled in bearings 37 respectively mounted upon parallel spaced bars 38 of a supporting frame, which frame also includes legs 39 upholding the bars 38 and cross pieces 40 rigidly connecting the upper ends of the legs 39. A hand-wheel 41 is mounted fast upon one extremity of the shaft 36, adapting said shaft to be manually subjected to rotation. So that it may be unnecessary for the operator to hold the hand-wheel 41 to prevent the cable unwinding therefrom, there is correlated with the shaft 36 a pawl and ratchet mechanism comprising a ratchet wheel 42 fast upon the shaft 36 adjacent to the wheel 41 and a pivoted pawl 43 engaging the ratchet wheel. Said pawl is acted upon by a spring 44 coiled upon a rod 45 slidable in a bracket 46, one end of said rod being pivotally engaged with the pawl, and the other being provided with a down-turned handle 47. The spring 44 being disposed between the bracket 46 and the pawl exerts a pressure upon the pawl tending to maintain it in engagement with the ratchet wheel. To disengage the pawl from the ratchet wheel, the rod 45 is manually displaced rearwardly.

A description will now be given of a mechanism for steering the road grader. Upon the platform 2 just in front of the supporting frame comprised by the members 38, 39 and 40, a shaft 48 is mounted in an almost vertical position, said shaft being inclined slightly forward from its lower to its upper end. The shaft 48 is provided at its lower end with a step bearing 49 mounted fast upon the platform 2, and at its upper end, said shaft is journaled in a horizontal member 49ª of a supporting frame, which frame further includes lateral bars 50 between which the member 49ª is extended, legs 51 supporting the forward ends of the members 50, the rear ends of said members being attached to the front legs 39 of the other supporting frame. Just above the bar 49ª, a steering wheel 52 is mounted fast upon the shaft 48. Adjacent to its lower end, a sprocket wheel 53 is mounted fast upon the shaft 48, said sprocket wheel being engaged by a short length of sprocket chain 54, the extremities of which respectively have connection with belts 55 which extend laterally at a forward inclination and are carried over idler pulleys 56 respectively mounted upon brackets 57 oppositely carried by the beams 1. The forward extremities of the belts 55 respectively have connection through turnbuckles 58 with the extremities of the axle 11, said extremities being allowed to project slightly beyond the beams 1 at each side of the grader.

An explanation as to the operation of my invention will now be given. When the machine begins to travel in the direction of the arrows shown in Fig. 5, the combined plowing and scraping tool automatically assumes the position indicated in full lines in said figure, and when the direction of travel is reversed, said member automatically shifts to the position indicated in dash lines in which said tool exercises solely the function of a plow. It is also to be observed that when the tool is in the position shown in full lines in Fig. 5 it acts solely as a scraper, the plows at such times having no function. This tool is not herein claimed as novel, being covered by previous patents of the applicant. When the operator wishes to raise the plowing and scraping member out of its working position, he subjects the wheel 41 to a rotation such as to wind the cable 33 upon the shaft 36. The crank forming ends of the axle will thus be raised and will communicate their displacement to the forward end of the frame and through said frame to the plowing and scraping tool. Since the weight of the forward end of the frame rests upon the extremities of the axle 11, said extremities tend to assume their lowermost positions, and consequently when the cable is allowed to unwind from the shaft 36, the front end of the frame and the plowing and scraping tool will due to their own weight lower sufficiently to bring the tool to its working position.

The steering mechanism previously described gives the operator a positive and accurate control over the direction of travel of the machine. Obviously when the shaft 48 is subjected to rotation by means of the hand-wheel 52, the correlated sprocket wheel 53 in the rotation to which it is thus subjected will feed the sprocket chain 54 laterally, and acting through the members 55 and 56 will produce a swivel motion of the axle. The travel of my road grader will be actuated by a traction engine which will preferably act upon the road grader at the rear end thereof.

The invention is presented as including all such modifications and changes as properly come within the scope of the following claim:

What I claim is:

In a device of the character described, the combination with a pair of transporting wheels, of an axle upon which said wheels are loosely mounted, said axle being formed with a pair of cranks, a frame one end of which is engaged and supported by said cranks, a lever rigidly projecting from the shaft in a substantially upwardly direction, a cable extending from the lever in a direction such as to elevate the frame through said cranks when said cable is placed under sufficient tension, a cylindrical member to which the cable is extended and secured, means for manually rotating said member to wind the cable thereupon, and means for restricting the shaft against a rotation such as to unwind the cable therefrom.

In testimony whereof I have signed my name to this specification in the presence of two subscribing witnesses.

EDWIN M. REESE.

Witnesses:
 A. MacKenzie,
 T. Phelps.